United States Patent
Shor et al.

(10) Patent No.: US 9,824,044 B2
(45) Date of Patent: Nov. 21, 2017

(54) COMMON PUBLIC RADIO INTERFACE (CPRI) LANE CONTROLLER COUPLED TO DIRECT MEMORY ACCESS (DMA) WHEREIN A TIME DIVISION DUPLEX (TDD) STEERS CONTROL OF CPRI

(71) Applicants: Roy Shor, Tel-Aviv (IL); Nir Baruch, Tel-Aviv (IL); Ori Goren, Kibutz Ruchama (IL); Amit Gur, Eyn Vered (IL)

(72) Inventors: Roy Shor, Tel-Aviv (IL); Nir Baruch, Tel-Aviv (IL); Ori Goren, Kibutz Ruchama (IL); Amit Gur, Eyn Vered (IL)

(73) Assignee: NXP USA, Inc., Austin, TX (US)

( * ) Notice: Subject to any disclaimer, the term of this patent is extended or adjusted under 35 U.S.C. 154(b) by 208 days.

(21) Appl. No.: 14/759,203

(22) PCT Filed: Jan. 10, 2013

(86) PCT No.: PCT/IB2013/050223
§ 371 (c)(1),
(2) Date: Jul. 3, 2015

(87) PCT Pub. No.: WO2014/108750
PCT Pub. Date: Jul. 17, 2014

(65) Prior Publication Data
US 2015/0347332 A1    Dec. 3, 2015

(51) Int. Cl.
*G06F 13/28*    (2006.01)
*G06F 13/42*    (2006.01)
(Continued)

(52) U.S. Cl.
CPC ............ *G06F 13/287* (2013.01); *G06F 13/24* (2013.01); *G06F 13/4282* (2013.01); *H04W 88/085* (2013.01)

(58) Field of Classification Search
CPC . G06F 13/287; H04W 72/1252; H04W 28/06; H04W 88/085
See application file for complete search history.

(56) References Cited

U.S. PATENT DOCUMENTS 8,270,321 B1 * 9/2012 Zhang .................. H04W 28/06
  370/280
2007/0091896 A1    4/2007 Liu
(Continued)

FOREIGN PATENT DOCUMENTS

JP    2007523577    8/2007

OTHER PUBLICATIONS

Ericsson AB et al., "CPRI Specification V6.0: Common Public Radio Interface (CPRI); Interface Specification," Ericcson AB, Huawei Technologies Co. Ltd., NEC Corp., Alcatel Lucent, Nokia Siemens Networks GmbH & Co. KG; Aug. 30, 2013; 128 pages, http://www.cpri.info/spec.html.*

(Continued)

*Primary Examiner* — Tammara Peyton

(57) ABSTRACT

A Common Public Radio Interface, CPRI, lane controller of a processor, in a Time Division Duplex, TDD, system, said CPRI lane controller comprising: a Direct Memory Access (or more than one), DMA, controller connected to a memory through a switch fabric to perform read or/and write memory access transactions via an internal system bus of said processor, wherein said DMA controller is adapted to generate a RX/TX transaction interrupt(s) for each completed memory access RX/TX transaction counted by a corresponding transaction counter(s) which provides a TDD slot awareness interrupt(s) when a RX/TX TDD slot has terminated, wherein said DMA controller has a steering control(s) adapted to steer the memory access transactions either to said memory or to be legitimately blocked by said switch fabric in response to said TDD slot awareness interrupt(s) to save bandwidth, BW, of the internal system bus of said processor.

20 Claims, 5 Drawing Sheets

(51) Int. Cl.
*G06F 13/24* (2006.01)
*H04W 88/08* (2009.01)

(56) References Cited

U.S. PATENT DOCUMENTS

| | | | |
|---|---|---|---|
| 2009/0180407 A1* | 7/2009 | Sabat | H04B 10/25754 370/280 |
| 2011/0125936 A1 | 5/2011 | Malleth et al. | |
| 2011/0302390 A1 | 12/2011 | Copeland et al. | |
| 2012/0057572 A1 | 3/2012 | Evans et al. | |
| 2015/0372930 A1* | 12/2015 | Shor | H04L 47/2458 370/329 |

OTHER PUBLICATIONS

International Search Report and Written Opinion correlating to PCT/IB2013/050223 dated Oct. 11, 2013.
PSC9132 QorIQ Qonverge Multicore Baseband Processor Reference Manual Covers PSC9132—Rev. E, Oct. 2011.
Texas Instrument: KeyStone I Architecture Antenna Interface 2 (AIF2) User's Guide Literature No. SPRUGV7E Nov. 2010.
MSC8157E Reference Manual Broadband Wireless Access Six Core DSP With Security MSC8157ERM Rev 2, Jan. 2012.

* cited by examiner

| Steering value | Target |
|---|---|
| 011 | CoreNet slaves |
| 000 | DSP cluster 0 |
| 001 | DSP cluster 1 |
| 010 | - |
| 100 | MAPLE slaves |
| 111 | Empty memory space |

Fig. 3

COMMON PUBLIC RADIO INTERFACE (CPRI) LANE CONTROLLER COUPLED TO DIRECT MEMORY ACCESS (DMA) WHEREIN A TIME DIVISION DUPLEX (TDD) STEERS CONTROL OF CPRI

FIELD OF THE INVENTION

The invention relates to a common public radio interface, CPRI, lane controller of a processor in a time division duplex, TDD, system for saving bandwidth in an internal system base of the respective processor.

BACKGROUND OF THE INVENTION

The increased use of smartphones and other mobile devices using internet applications, video calls and e-mail is driving an unprecedented increase in world-wide wireless network traffic.

From a Network operator's perspective, the key factors in driving wireless network topologies are their ability to meet demands for bandwidth, user capabilities as well as quality of service, QoS.

Achieving the required capacities and fulfilling the quality of service, QoS, requirements depend on multiple factors, such as proximity of the users relative to the base station of the transceivers, the numbers of users in a cell, data throughputs and patterns as well as core network capabilities.

In conventional cellular networks macrosites can be installed on e.g. roof tops or at designated cell sites that typically have the base band units with the transceivers and RF power amplifiers in a cabinet enclosure while the antenna resides for instance on a tower mast. In such a conventional network the cabinet can be connected using a coaxial cable to the antenna on the antenna mast. This is the most common cell site approach for mobile cellular networks.

In LTE networks, the network architecture is transformed by the introduction of remote radio heads, RRH, which can be connected to a base station BS via fiber optic cables. The network can employ macro or micro base stations, the same as a traditional cellular site, but instead of having a conventional tall antenna mast, fiber optic cables can be used to distribute the base station signals for a group of antennas placed remotely in outdoor or indoor locations where required.

A common public radio interface, CPRI, forms a protocol interface between a radio equipment control, REC, and a radio equipment, RE, in a wireless network. The station is in a conventional wireless network located adjacent to the antenna in a small cabinet at the base of the antenna tower. Finding suitable sites can be a challenge because of the footprint required for the cabinet, a possible need for structural reinforcement of roof tops as well the availability of primary and back-up power sources. The common public radio interface, CPRI interface, allows the use of a distributed architecture where base stations containing the radio equipment control REC can be connected to remote radio heads RRH via wireless fiber links that carry the CPRI data. This architecture makes it possible that the remote radio heads RRH containing the radio equipment RE can be situated in environmentally challenging locations. The base stations containing the radio equipment control REC can be located centrally in less challenging locations where footprint, climate and power availability can be managed more easily. The CPRI data is transmitted in a downlink DL by the base station to the radio equipment RE and received in an uplink UL by the base station from the radio equipment RE.

According to the CPRI protocol, there are two links, i.e. the uplink UL and the downlink DL which are always running, i.e. the receiving and transmitting data transmissions exist all the time. The time division duplex, TDD protocol, is emulated by the CPRI protocol as a transmission perception of zeroes via a link. The CPRI link comprises an uplink UL for receiving CPRI data from said radio equipment RE and said downlink DL for transmitting CPRI data to said radio equipment RE, wherein a zero bit stream it is transported in the uplink UL, when CPRI data is transported in the downlink DL, and wherein a zero bit stream is transported in the downlink DL, when CPRI data is transported in the uplink UL.

If the uplink/downlink ratio UL/DL-ratio is, for instance, 0.5 then. 50% of the bandwidth BW is wasted. The CPRI framer, the CPRI direct memory access DMA, controller of a conventional CPRI lane controller transfers zeroes to the link in the quiet periods so that the required traffic with the memory connected to the CPRI lane controllers is double the really necessary required traffic carrying information.

Consequently there is a bandwidth, BW, waste in the internal system bus of the processor which comprises a conventional common public radio interface, CPRI, lane controller.

Accordingly, it is an object of the present invention to provide a common public radio interface, CPRI, lane controller that overcomes the above-mentioned problems and which avoids an unnecessary occupation of bandwidth BW in an internal system bus of the respective processor.

SUMMARY OF THE INVENTION

The present invention provides a CPRI lane controller, a processor, a method, a basestation and a program as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of different aspects of the present invention will be described by way of example only, with reference to the enclosed drawings. Elements in the figures are illustrated for simplicity and clarity and have not necessarily being drawn to scale.

FIG. 3 shows a table for illustrating a processor fabric address mapping scheme as employed by a CPRI lane controller;

DETAILED DESCRIPTION OF EMBODIMENTS

Figure 1:
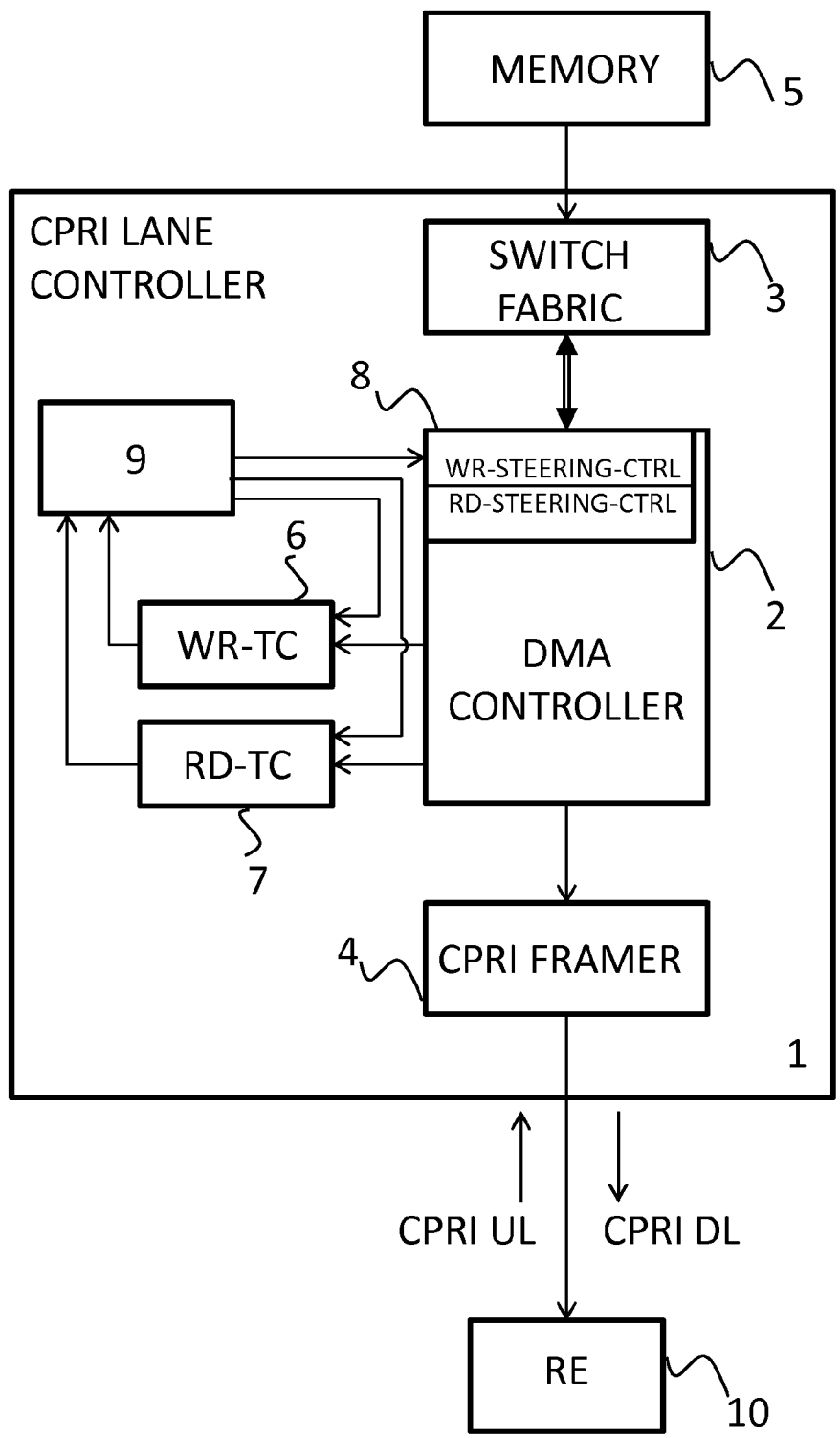
FIG. 1 shows a block diagram of a example of a common public radio interface, CPRI, lane controller.

In a possible example, the common public radio interface, CPRI, lane controller of a processor in a time division duplex TDD system, the CPRI lane controller can comprise:

direct memory access controller connected to a memory through a switch fabric to perform read or write memory access transactions via an internal system bus of the processor, wherein said direct memory access controller is adapted to generate a transaction interrupt for each completed memory access transaction counted by a corresponding transaction counter which provides a TDD slot awareness interrupt when a TDD slot has terminated, wherein the DMA controller has a steering control adapted to steer the memory access transactions either to said memory or to be blocked in a legitimate way by said switch fabric in response to the TDD slot awareness interrupt without any errors evoked to save bandwidth of the internal system bus of said processor.

The switch fabric can nicely block the transactions with the correct steering bits settings so that no error interrupts are evoked. The transactions are closed according to the bus protocol with proper properties. No transactions are initiated in RD/WR operations. In case of read (RD) transactions either arbitrary data or zero data (compliant with the CPRI specification) can be returned, according to the switch fabric specific implementation.

Specific embodiments of the common public radio interface lane controller are described in the dependent claims.

In a possible example, the common public radio interface, CPRI, lane controller, the memory can be connected to said switch fabric of said common public radio interface, CPRI, lane controller by the internal system bus of said processor which comprises at least one high-speed serial interface, HSSI, block which includes said CPRI lane controller.

In a further possible example, the common public radio interface, CPRI, lane controller, the CPRI lane controller of said high-speed serial interface can transmit and receive CPRI data via a CPRI serial data link to/from a radio equipment of a remote radio head or a radio equipment control.

In a still further possible example, the common public radio interface, CPRI, lane controller, the CPRI link connecting said CPRI lane controller with said radio equipment of said remote radio head or with said a radio equipment control comprises an uplink, UL, for receiving CPRI data in a continuous serial bit stream from said radio equipment or radio equipment control, and a downlink, DL, for transmitting CPRI data in a continuous serial bit stream to said radio equipment of the remote radio head or to a radio equipment control.

In a still further example, the common public radio interface, CPRI, lane controller, a predetermined number of the bits of said continuous serial bit stream is transported in a basic frame.

This basic frame can represent a data chip and can be packed together with a predetermined number of other basic frames in a hyper frame.

In a example, the hyper frame can be packed with a predetermined number of other hyper frames into a radio frame.

In a further possible example, the common public radio interface, CPRI, lane controller, through said CPRI link comprising said uplink for receiving CPRI data from said radio equipment or radio equipment control and said downlink for transmitting CPRI data to said radio equipment or radio equipment control, a zero bit stream is transported in said uplink when CPRI data is transported in the downlink and a zero bit stream is transported in the downlink, when CPRI data is transported in the uplink.

If the CPRI link is idle a zero bit stream is transported in the uplink and in the downlink.

In a further possible example, the common public radio interface, CPRI, lane controller, an uplink, UL, to a downlink, DL to idle, ratio between CPRI data transported in the uplink of the CPRI link and CPRI data transported in said downlink of said CPRI link is configurable.

In a still further possible example, the common public radio interface, CPRI, lane controller, the CPRI lane controller comprises a CPRI framer.

In a possible example, the common public radio interface, CPRI, lane controller, the CPRI framer is adapted to encapsulate data received from said DMA controller into frames transmitted through said CPRI link to said radio equipment or radio equipment control.

In a still further possible example, the common public radio interface, CPRI, lane controller, the CPRI framer is further adapted to extract data from received frames received through said CPRI link from said radio equipment or radio equipment control, wherein the extracted data are supplied to said DMA controller of said common public radio interface, CPRI, lane controller.

In a further possible example, the common public radio interface, CPRI, lane controller, the CPRI lane controller comprises a write transaction counter which is adapted to count write transactions performed by said DMA controller through said switch fabric to write data to said memory via said internal system bus of said processor.

In a further possible example, the common public radio interface, CPRI, lane controller, the write transmission counter is triggered to start counting on the first agreed radio frame boundary between two radio frames of the received continuous serial bit stream transported via said CPRI uplink detected by said CPRI framer.

In a further example, the write transaction counter of the common public radio interface, CPRI, lane controller is incremented with each write transaction performed by the DMA controller of said common public radio interface, CPRI, lane controller.

In a further possible example, the common public radio interface, CPRI, lane controller, the CPRI lane controller further comprises a read counter which is adapted to count read transactions performed by the DMA controller through said switch fabric to read data from said memory via said internal system bus of said processor.

In a further possible example, the common public radio interface, CPRI, lane controller, a read transaction counter is triggered to start counting upon detection on the first agreed radio frame boundary between two radio frames of the transmitted continuous serial bit stream encapsulated by said CPRI framer into frames.

In a possible example, the common public radio interface, CPRI, lane controller, said read transaction counter is incremented with each read transaction performed by said DMA controller of said common public radio interface, CPRI, lane controller.

In a further possible example, the common public radio interface, CPRI, lane controller, said transaction counters generate a TDD slot awareness interrupt if a corresponding configurable threshold value is reached.

There is an interrupt generated by a write transaction counter and an interrupt generated by a read transaction counter.

In a further possible example, the common public radio interface, CPRI, lane controller, the threshold value of a counter can be set according to a configured uplink/downlink/idle ratio of the respective CPRI link and a transaction size of a memory access transaction.

In a still further possible example, the common public radio interface, CPRI, lane controller, in each memory access transaction, a predetermined number of data bits are exchanged between said switch fabric of said CPRI lane controller and said memory and associated steering bits are provided as sideband information for each memory access transaction to indicate a data path to be taken by said data bits via said internal system bus provided between said switch fabric and said memory.

In a further possible example, the common public radio interface, CPRI, lane controller, the steering control of said DMA controller is adapted to steer the memory access transaction to be blocked in a legitimate way by said switch fabric in response to said TDD slot awareness interrupt by setting the steering bits of the respective memory access transaction to a predetermined code.

In a still further possible example, a common public radio interface, CPRI, lane controller, the setting of the steering bits to a predetermined code in response to the TDD slot awareness interrupt is performed by a program executed by a core of said processor which comprises a CPRI lane controller comprising said DMA controller with the steering control adapted to steer the memory access transactions.

In a further possible alternative example, the common public radio interface, CPRI, lane controller, the setting of the steering bits to a predetermined code in response to the TDD slot awareness interrupt is performed by a steering bit control logic of the processor comprising the CPRI lane controller.

In a example the steering bit control logic can also be integrated in the CPRI lane controller.

In a further possible example, the common public radio interface, CPRI, lane controller, the memory connected to the direct memory access controller via the switch fabric is formed by double data rate, DDR, memory connected to a DDR controller of said processor which is connected to said high-speed serial interface, HSSI, of said processor via a fabric that connects the processor to the DDR controller.

In a further possible example, the common public radio interface, CPRI, lane controller, said memory is formed by a cache memory of the processor, connected to said high-speed serial interface, HSSI, of said processor via a fabric.

In a still further possible example, the common public radio interface, CPRI, lane controller, the memory forms part of a hardware acceleration engine of said processor connected to said high-speed serial interface, HSSI, of said processor via a fabric.

As another example, a processor comprising a high-speed serial interface, HSSI, with at least one common public radio interface, CPRI, lane controller is provided for exchanging CPRI data via a CPRI fiber link with a radio equipment, RE, of a remote radio head, RRH, or a radio equipment control, REC.

As another example, a base station of a wireless network comprising at least one processor is provided connected to an associated radio equipment, REC, of a remote radio head, RRH, or a radio equipment, REC, control via the CPRI fiber link.

In a possible example, the base station is a base station of a wireless network comprising an LTE network.

In a possible example, the base station is a base station of a wireless network comprising a WCDMA network.

In a still further possible example, the base station is a base station of a wireless network comprising a GSM network.

In a still further possible example, the base station is a base station of a wireless network comprising a WIMAX network.

In a further example, a method for saving bandwidth of an internal system bus is provided.

According to a possible example, the method for saving bandwidth of an internal system bus which is provided between a switch fabric of a common public radio interface, CPRI, lane controller within a processor and a memory for performing read or write memory access transactions by a direct memory access, DMA, controller of said CPRI lane controller, said method comprises the steps of:

generating a transaction interrupt by said DMA controller for each completed memory access transaction;

providing a TDD slot awareness interrupt by a transaction counter incremented by each transaction interrupt if a configured counter threshold of the transaction counter is reached; and steering by the DMA controller the memory access transactions either to said memory or to be blocked by said switch fabric of said processor in response to the provided TDD slot awareness interrupt.

In a example the processor can then reconfigure the threshold and reset the transaction counter.

According to a further example a program comprising instructions adapted to perform the method according to the third aspect is provided.

In a further possible example, the program comprises instructions adapted to perform a method for saving bandwidth of the internal system bus provided between a switch fabric of a common public radio interface, CPRI, lane controller within a processor and a memory for performing read or write memory access transactions by a direct memory access, DMA, controller of the CPRI lane controller, wherein the instructions of said program are adapted to perform the steps of:

generating a transaction interrupt by said DMA controller for each completed memory access transaction;

providing a TDD slot awareness interrupt by a transaction counter incremented by each transaction interrupt if a configured counter threshold of the transaction counter is reached; and steering by the DMA controller the memory access transactions either to said memory or to be blocked by said switch fabric of said processor in response to the provided TDD slot awareness interrupt. In a possible example, the program memory can form part of the processor, in particular a digital signal processor DSP or a general purpose processor GPP or a central processing unit, CPU.

FIG. 1 shows a block diagram of a possible example of a CPRI lane controller 1. The CPRI lane controller 1 as illustrated in FIG. 1 can form part of a processor used in a time division duplex, TDD system. This processor can be in a example a digital signal processor DSP. Further it can be a general purpose processor, GPP, or a central processing unit, CPU. The CPRI lane controller 1 as shown in FIG. 1 comprises at least one direct memory access DMA controller 2 connected to a switch fabric 3 and a CPRI framer 4 as illustrated in FIG. 1. The direct memory, DMA, controller 2 is connected to a memory 5 through the switch fabric 3 to perform read or write memory access transactions via an internal system bus of the processor such as a DSP processor. The DMA controller 2 is adapted to generate a transaction interrupt for each completed memory access transaction.

Each transaction interrupt is counted by a corresponding transaction counter. In the embodiment shown in FIG. 1 the CPRI lane controller 1 comprises a write transaction counter 6 and a read transaction counter 7 as illustrated in FIG. 1. The write transaction counter 6 is adapted to count write transactions performed by the DMA controller 2 through the switch fabric 3 to write data to the memory 5 via the internal system bus of the processor. The DMA controller 2 is adapted to generate a RX/TX transaction interrupt for each completed RX/TX memory access transaction counted by a corresponding transaction counter. The read transaction counter 7 of the CPRI controller 1 is adapted to count read transactions performed by the DMA controller 2 through the switch fabric 3 to read data from the memory 5 via the internal system bus of the processor. Accordingly, each completed memory access RX/TX transaction is counted by a corresponding transaction counter which provides a TDD slot awareness interrupt when a time division duplex, TDD, slot has terminated. In a example the transaction counters generate a TDD slot awareness interrupt if a corresponding configurable threshold has been reached. This configurable threshold value can be set according to a configured UL/DL idle ratio of the CPRI link and a transaction size of a memory access transaction, wherein the threshold can be reconfigurable every TDD slot. The TDD slot comprises the size (e.g. in bytes) of data transmitted/received during the duration of an operation state comprising a read (RD) state, write (WR) state or an idle state.

As shown in FIG. 1 the DMA controller 2 comprises a steering control 8 which is adapted to steer the memory access transactions either to said memory 5 or to be blocked by the switch fabric 3 in response to the TDD slot awareness interrupt to save bandwidth of the internal system bus of the respective processor comprising the CPRI lane controller 1 shown in FIG. 1. The steering control 8 can comprise a write steering control (WR-STEERING-CTRL) and a read steering control (RD-STEERING-CTRL) as shown in FIG. 1.

In a example in each memory access transaction a predetermined number of data bits are exchanged between the switch fabric 3 of the CPRI lane controller 1 and the memory 5, wherein associated steering bits SB are provided as sideband information for each memory access transaction. These steering bits SB can indicate a data path to be taken by data bits via the internal system bus which is provided between said switch fabric 3 and the memory 5. A possible processor fabric address mapping is for example illustrated in the table of FIG. 3.

The steering control 8 of the DMA controller 2 is adapted to steer the memory access transaction to be blocked by the switch fabric 3 in response to the TDD slot awareness interrupt by setting the steering bits of the respective memory access transaction to a predetermined code. In a example the steering control 8 can comprise a write memory transaction and a read steering control for read memory transactions. In a still further examples there can also be provided two separate DMA controllers 2 wherein a first DMA controller has a write steering control for write memory transactions and a second DMA controller has a read steering control for read memory transactions. The setting of the steering bits SB to the predetermined code is performed in response to the TDD slot awareness interrupt. This setting can be formed in a example by a program executed by a core of the respective processor. In an alternative embodiment such as illustrated in FIG. 1 the CPRI lane controller 1 can comprise a steering bit control logic 9 for performing the setting of the steering bits SB to a predetermined code in response to the TDD slot awareness interrupt received from one of the transaction counters 6, 7. Accordingly, the setting of the steering bits SB can be performed by a software program or by a hardware circuit forming the bit control logic 9 as shown in FIG. 1. In the embodiment shown in FIG. 1 the steering bit control logic 9 forms part of the CPRI lane controller 1. In an alternative embodiment the steering bit control logic 9 is a circuit of the processor comprising the CPRI lane controller 1 as shown in FIG. 1.

The switch fabric can nicely block the transactions with the correct steering bits settings so that no error interrupts are evoked. The transactions are closed according to the bus protocol with proper properties. No transactions are initiated in RD/WR operations. In case of read (RD) transactions either arbitrary data or zero data (compliant with the CPRI specification) can be returned, according to the switch fabric specific implementation.

The steering bit control logic 9 can be adapted to reconfigure the transaction counters 6, 7 and to perform a reset of the transaction counters 6, 7 after a threshold value of the respective transaction counter has be reached as illustrated in FIG. 1.

The memory 5 is connected to the switch fabric 3 of the common public radio interface, CPRI, lane controller 1 via an internal system bus of a processor. This processor can comprise at least one high-speed serial interface which includes the CPRI lane controller 1 shown in FIG. 1. The CPRI lane controller 1 of the high-speed serial interface, HSSI, transmits and receives CPRI data via a CPRI serial data link to/from a radio equipment, RE, 10 as shown in FIG. 1. Further, it is possible that the CPRI lane controller 1 of the high-speed serial interface, HSSI, transmits and receives CPRI data via a CPRI serial data link to/from a radio equipment control, REC. The CPRI link connecting the radio equipment, RE, of a remote radio head, RHH, and the CPRI framer 4 of the CPRI lane controller 1 comprises an uplink, UL, and a downlink, DL. The uplink, UL, is provided for receiving CPRI data in a continuous serial bit stream from the radio equipment, RE, 10. The downlink, DL, is provided for transmitting CPRI data in a continuous serial bit stream to said radio equipment, RE, 10 of the remote radio head, RRH. A predetermined number of the bits of the continuous serial bit stream can be transported in a basic frame, BF. This basic frame, BF, can for instance represent a data chip. The basic frame, BF, can be packed together with a predetermined number of other basic frames, BF, into a so-called hyper frame, HF. This hyper frame, HF, can be packed in turn together with a predetermined number of other hyper frames, HF, into a so-called radio frame, RF. Through the CPRI link comprising the uplink, UL, for receiving CPRI data from the radio equipment 10 and the downlink, DL, for transmitting CPRI data to said radio equipment 10, a zero bit stream is transported in the uplink, UL, when CPRI data is transported at the same time in the downlink, DL. In the same manner a zero bit stream is transported in the downlink, DL when CPRI data is transported at the same time in the uplink, UL. In a example an uplink, UL, to downlink, DL, ratio, UL/DL/idle ratio, between CPRI data transported in the uplink, UL, of the CPRI link and CPRI data transported in the downlink, DL, of the CPRI link is configurable.

As shown in FIG. 1 the common public radio interface, CPRI, lane controller 1 comprises the CPRI framer 4. This CPRI framer 4 is adapted to encapsulate data received from the DMA controller 2 into frames. These frames are then be transmitted through the CPRI link in downlink direction to said radio equipment, RE, 10. The CPRI framer 4 is further adapted to extract data from received frames received from said CPRI link in uplink direction from said radio equipment, RE; 10. These extracted data can then be supplied by the CPRI framer 4 to the DMA controller 2 of the common public radio interface, CPRI, lane controller 1 as shown in FIG. 1.

In a example of the CPRI lane controller 1 a write transaction counter 6 is triggered to start counting on the first agreed radio frame, RF, boundary between two radio frames of the received continuous serial bit stream transported via the CPRI uplink is detected by the CPRI framer 4. The write transaction counter 6 is then incremented with each write transaction performed by the DMA controller 2 of the common public radio interface, CPRI, lane controller 1.

The read transaction counter 7 is triggered to start counting upon detection of a first agreed radio frame boundary, between two radio frames, RF, of the transmitted continuous serial bit stream encapsulated by the CPRI framer 4 into frames. The read transaction counter 7 is then incremented with each read transaction performed by the DMA controller 2. Both transaction counters 6, 7 finally generate a TDD slot awareness interrupt when a configurable threshold value has been reached. The TDD slot awareness interrupt generated by the transaction counter 6, 7 can be supplied to the steering bit control logic 9 as shown in the embodiment of FIG. 1. Threshold values of the different transaction counters 6, 7 can be set separately. In a example the threshold value is set according to a preconfigured uplink/downlink/idle ratio of the respective CPRI link and a transaction size of a memory access transaction performed by the DMA controller 2 through a switch fabric 3 of the memory 5. In a example the counter threshold is reconfigured all the time. It is not constant according to the UL/DL/idle ratio because the counter is provided to count transactions. A dynamic update of the threshold takes care of variances. The calculation of the dynamic threshold can be performed by a program running on a processor core or a dedicated calculation circuit. In each memory access transaction a predetermined number of data bits is exchanged between the switch fabric 3 of the CPRI lane controller 1 and the memory 5. The associated steering bits SB form sideband information for each memory access transaction and do indicate a data path to be taken by the data bits via the internal system bus of the processor. The transactions from the CPRI lane controller 1 are going through the switch fabric 3 which can be formed by an AXI switch fabric. The transactions counters 6, 7 get an interrupt from the DMA controller 2 indicating that a memory access transaction has been completed. There can be a specific interrupt per each read transaction and a specific interrupt per each write transaction. These interrupts are counted by the transaction counters 6, 7. The transaction counters 6, 7 can be formed by SOC timers of the processor. In a example the SOC counters can be configured by a program to count the interrupts and to assert a symbol awareness or TDD time slot awareness interrupt when the corresponding threshold values have been reached. Because of the SOC timers granularity the granularity of turning on/off using steering bits is the transaction size for a memory access transaction.

The steering control 8 of the DMA controller 2 is adapted to steer the memory access transaction to be blocked by the switch fabric 3 in response to the TDD slot awareness interrupt by setting the steering bits SB of the respective memory access transaction to a predetermined code. This blocking is performed nicely in that the blocking is performed in a legitimate way of blocking transactions, i.e. without evoking any errors. This predetermined code can be for instance a blocking bit code (NULL). In a example the steering bits SB can be set to the predetermined code in response to the TDD slot awareness interrupt by a separate program or by a hardware steering bit control logic of the processor. The DMA controller 2 of the CPRI lane controller 1 is never turned off and thus all address pointers and transactions interrupts continue as usual. The consumer program using the data knows where it can find the data as well as the valid data location in the memory 5 remains unaffected.

The memory 5 shown in FIG. 1 can in a example be a double data rate, DDR, memory connected to a DDR controller of the respective processor. This DDR controller can be connected to the high-speed serial interface, HSSI, of the processor via a fabric that connects the processor to the DDR controller.

The memory 5 shown in FIG. 1 can also be formed by a cache memory of the processor. Moreover, the memory 5 can form part of a hardware acceleration engine of the processor connected to the high-speed serial interface, HSSI, of the processor. The hardware acceleration engine comprising the memory 5 as shown in FIG. 1 can be provided for instance for a turbo decoding and turbo encoding. Moreover, the hardware acceleration engine can be provided for FFT/IFFT processing as well as DFT/IDFT processing of bit streams. The hardware acceleration engine comprising the memory 5 can perform other functions as well such as CRC check and insertion or equalization functions. Further possible functions performed by the hardware acceleration engine comprising the memory 5 are matrix inversion or downlink spreading, scrambling. The hardware acceleration engine supports hardware acceleration for forward error correction schemes including turbo decoding and turbo encoding and rate matching equalization schemes, matrix operations, CRC insertion. Further it can perform different transformation calculations and chip rate acceleration. The hardware acceleration engine can for instance comprise a RISC processor based interface.

Figure 2:
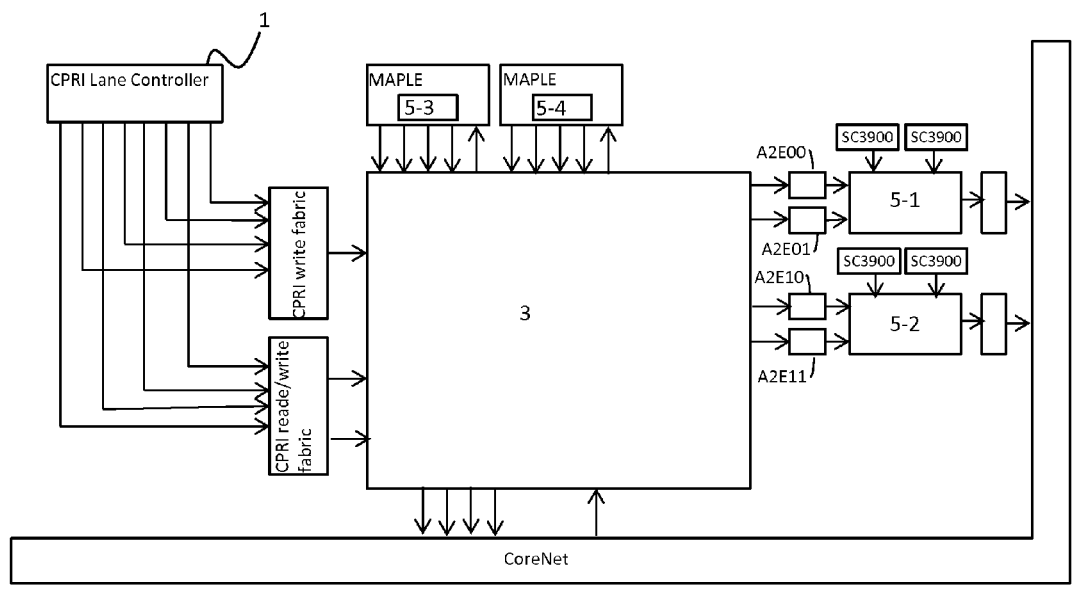
FIG. 2 shows a block diagram of an example of a processor comprising a CPRI lane controller.

FIG. 2 shows a block diagram of an example of a processor comprising a common public radio interface, CPRI, lane controller 1. In the shown example the processor is formed by a DSP processor having as its switch fabric 3 a DSP AXI interconnect switch fabric for e.g. 128 bits of data. In the shown example the AXI fabric 3 provides connection between three cache memories 5-1, 5-2, of a processor core cluster (SC3900), three acceleration engines (MAPLE: Multi-accelerator Platform Engine) each having a memory 5-3, 5-4, the CPRI lane controller 1 and a core net fabric of the digital signal processor DSP. The switch fabric 3 enables the CPRI lane controller 1 and the multi-accelerator platform engines (MAPLE) to access L2 cache memories 5-1, 5-2, 5-3 of the core processor cluster. Further, the switch fabric 3 enables accesses between different multi-accelerator platform engines (MAPLE). The switch fabric 3 allows further accesses of the CPRI lane controller 1 to the multiple accelerator platform engines. Moreover, the switch fabric 3 provides for core net fabric to MAPLE accesses and MAPLE to core net fabric accesses. As shown in FIG. 2 the CPRI lane controller 1 is connected to the switch fabric 3 in the shown implementation by means of a CPRI write fabric and by means of a CPRI read/write fabric. The switch fabric 3 enables a high bandwidth low latency access between the different blocks or entities, especially low latency accesses to the cache memories 5-1, 5-2 of the processor core.

The steering bits SB define the path in which a memory access transaction is to be routed in order to get a high performance. For example, if SC3900 processor core 0 in the DSP cluster 0 does use the data, it is advised to write SC3900 cluster 0 and fill up its cache L2 memory. If, for any reason the user does not want the data to arrive to any destination, the steering bits SB can write to the empty memory space (steering bits=111) as illustrated in the table of FIG. 3. A2E_0 in FIG. 2 means that this master access DSP cluster via the first AXI cluster bridge. A2E_1 means that this master access DSP cluster via the second AXI cluster bridge. In a example configuration registers of the CPRI lane controller 1 and/or the hardware acceleration engines, MAPLE, can determine the steering inside the digital signal processor, DSP, interconnect according, for instance, by the DSP fabric address mapping table shown in FIG. 3.

Figure 4:
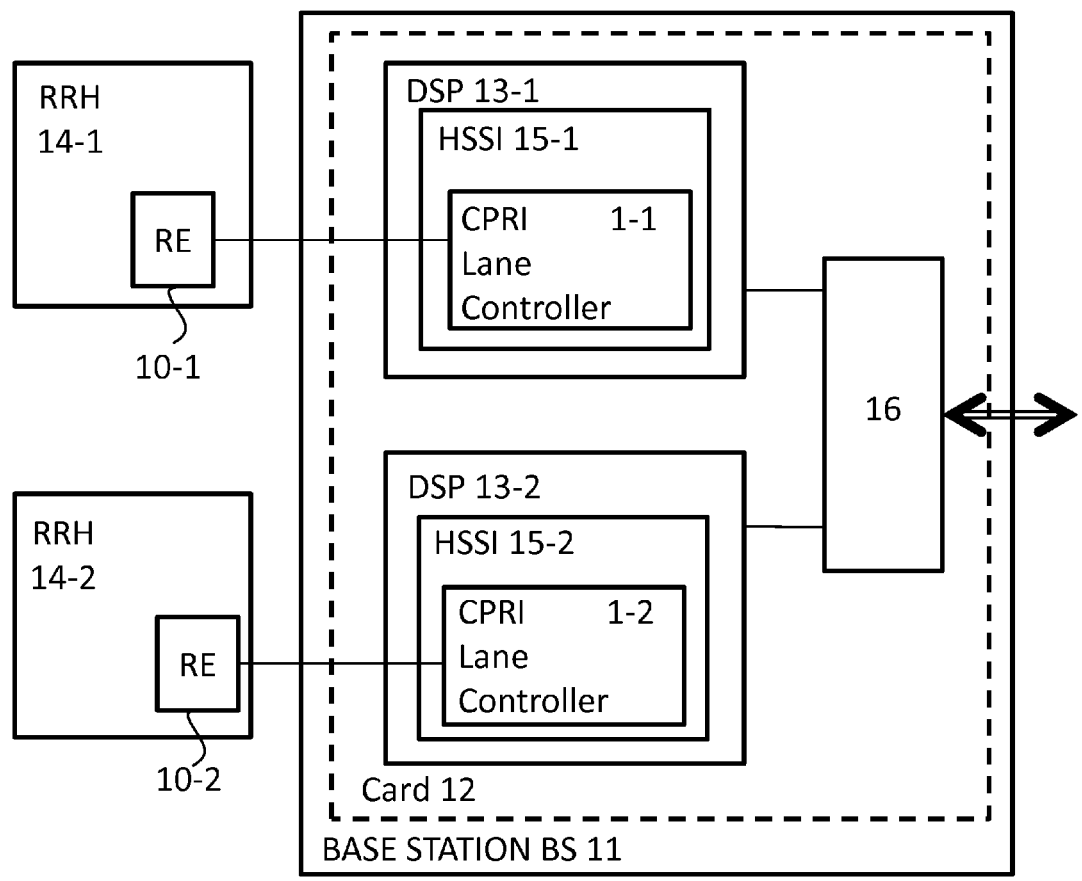
FIG. 4 shows a block diagram of a base station comprising processors each having a CPRI lane controller.

FIG. 4 shows a block diagram of a possible example of a base station 11. The base station 11 can comprise a channel card 12 comprising digital signal processors 13-1, 13-2 each digital signal processor, 13-$i$, being provided for a corresponding remote radio head, RRM, 14-1, 14-2 each comprising in the shown embodiment a corresponding radio equipment, RE, 10-1, 10-2. Each remote radio equipment 10-$i$ is connected via a CPRI link to a corresponding CPRI lane controller 1-1, 1-2 within a corresponding high-speed serial interface, HSSI, 15-1, 15-2 of the respective digital signal processor 13-1, 13-2 as illustrated in FIG. 4. The link between the radio equipment 10-$i$ and the corresponding CPRI lane controller 1-$i$ can be a fiber link for transporting CPRI data in an uplink and downlink direction. The communication card 12 of the base station 11 can further comprise a communication processor 16 connected to the wireless access DSP 13-1, 13-2 as illustrated in FIG. 4. The base station BS, 11 can be connected to the radio equipment, RE, through a networking REC/RE.

Figure 5:
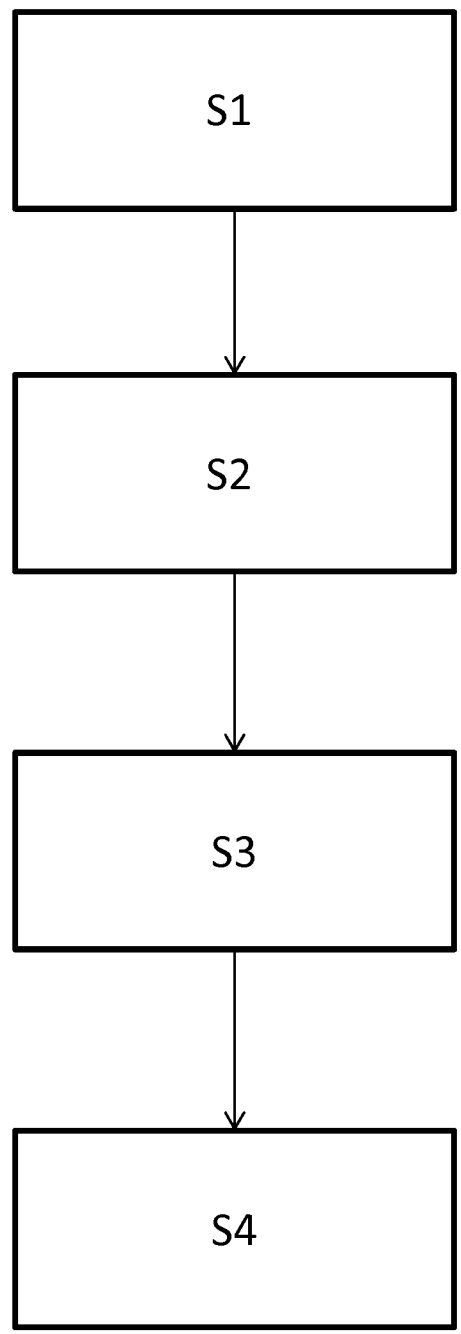
FIG. 5 shows a flow chart of an example of a method for saving bandwidth of an internal system bus.

FIG. 5 shows a flow chart of a example of a method for saving bandwidth BW, of an internal system bus. The internal system bus is provided in a example between a switch fabric of a common public radio interface, CPRI, lane controller such as the controller 1 shown in FIG. 1 within a processor. This processor can be a DSP processor such as a wideband wireless access DSP 13-$i$ as illustrated in FIG. 4. An internal system bus can be provided between the switch fabric 3 and a memory 5 for performing read or write memory access transactions by a direct memory, DMA, controller such as DMA controller 2 shown in FIG. 1. The memory 5 can be a cache memory of the processor or a memory integrated in a hardware acceleration engine MAPLE of the processor. Moreover, the memory 5 can be in a example be formed by a double data rate, DDR, memory connected to a DDR controller of the processor.

In a first step S1 of this method a transaction interrupt is generated by the DMA controller for each completed memory access transaction.

In a further step S2 a TTD slot awareness interrupt is provided by a transaction counter incremented by each transaction interrupt if a configured counter threshold value of the transaction counter is reached. In a example a transaction counter can be provided for each type of memory access transaction. In a possible implementation a write transaction counter is provided for write memory access transactions and a read transaction counter is provided for read memory access transactions.

In a further step S3 the memory access transactions are steered by the DMA controller either to the memory or to be blocked by the switch fabric of the processor in response to the provided TDD slot awareness interrupt. In a further step S4 the processor can reconfigure the threshold and reset the transaction counter. The method shown in FIG. 5 can be performed separately for read and write transactions.

The method shown in the example of FIG. 5 can be performed by a program comprising instructions adapted to perform the steps illustrated in FIG. 5. This program can be stored in a program memory. The program memory can be a program memory of a processor and can store a program having instructions to perform the method shown in FIG. 5. The program memory can be integrated in a digital signal processor, DSP. Accordingly, the method may be implemented in a computer program for running on a computer system, at least including code portions for performing steps of a method according to the present invention as illustrated in FIG. 5 when run on a programmable apparatus. This programmable apparatus can be a computer system for enabling a programmable apparatus to perform functions of a device or system according to the present invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette stored with data loadable in a memory of a computer system, the data representing the computer program. The data carrier for carrying data can be implemented by a data connection such as a telephone cable or a wireless connection.

The term "bus", in particular an internal system bus, is used to refer to a plurality of signals or conductors which may be used to transfer data. The terms "assert" or "set" and "negate" are used herein when referring to the rendering of a signal, status bit, or similar apparatus into its logically true or logically false state, respectively.

Each signal described herein may be designed as a positive or negative logic, where negative logic can be indicated by a bar over the signal name and an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in an alternative embodiments those signals described as positive logic signals may be implemented as negative logic signals and those signals described as negative logic signals may be implemented as positive logic signals.

Some of the embodiments, as applicable, can be implemented using a variety of different information processing systems or elements. For example, although FIG. 1 and the discussion thereof describe an information processing architecture, this architecture is presented merely to provide a useful reference in discussing various aspects of the invention. Of course, the description of the architecture has been simplified for purposes of discussion, it is just one of many different types of appropriate architectures that may be used in accordance with the present invention. Those skilled in the art will recognize that the boundaries between the logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively associated such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality.

Peripheral and I/O circuitry shown in the above embodiments may be also located on separate integrated circuits or devices.

All or some of the software components described herein may be received, for example, from computer readable media such as a memory or other media of other computer systems. A memory such as the memory 5 can be formed by computer readable medium. Such computer readable media may be permanently, removably or remotely coupled to an information processing system or a CPRI lane controller 1 such as shown in FIG. 1. The computer readable media may be tangible and non-transitory, and include, for example, and without limitation, any number of the following: magnetic storage medium including disk and tape storage media, optical storage media such as compact disk media and digital video disk storage media. Further, the computer readable media may include nonvolatile memory storage media including semiconductor-based memory units such as FLASH memory, EEPROM, EPROM, ROM, ferromagnetic digital memories, MRAM, volatile storage media including registers, buffers or caches, main memory, RAM, etc.

In a example a program for saving bandwidth in an internal system bus according to an aspect of the present invention can be executed on a computer system. In a example such a computer system can be a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A possible computer system includes at least one processing unit, an associated memory and a number of input/output devices.

The CPRI lane controller 1 according to an aspect of the present invention is not limited to physical devices or units implemented in non-programmable hardware but can also be applied in programmable devices or units able to perform the desired device functions by operating in accordance with a suitable program code. Furthermore, these devices may be physically distributed over a number of apparatuses, while functionally operating as a single device. Further, devices functionally forming separate devices may be integrated in a single physical device. Other modifications, variations and alternatives are also possible. The specifications and drawings are, therefore, to be regarded as illustrative rather than in a restrictive sense.

In the claims, any reference signs placed between parentheses shall not be constructed as limiting the claim. The word "comprising" does not exclude the presence of other elements or steps than those listed in the claim. Furthermore, the terms "a" or "an" as used in the claims herein, are defined as one or more than one. Also, the use of an introductory phrase such as "at least one" and "one or more" in the claims should not be construed to imply that the introduction of another claim element by the indefinite articles "a" or "an" limits any particular claim containing such introduced claim elements to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

In the foregoing specification the present invention has been described with reference to specific examples of embodiments of the present invention. It will, however, be evident that various modifications and changes may be made therein without departing from the broader spirit and scope of the present invention as set forth in the enclosed claims. For example, the connections may be a type of connection suitable to transfer signals from or to the respective nodes, units or devices, for example via intermediate devices. Accordingly, unless implied or stated otherwise, the connections may be, for example, be direct connections or indirect connections.

The present invention provides in a example a CPRI LTE TDD implementation over a FDD system for DDR bandwidth reduction. The method and apparatus according to the present invention can be employed for different kinds of wireless network systems. According to a further aspect of the present invention, a base station of a wireless network comprising at least one processor is provided. This processor can be connected to an associated radio equipment, RE, of a remote radio head, RRH, via a CPRI fiber link. The base station can be in a example a base station of a LTE network. The base station can be in another example a base station of a WCDMA network. Further, the base station can be a base station of a GSM network or a WIMAX network. The frame structure described by the CPRI framer can be implemented depending on the frame structure of the different wireless network protocols.

The invention claimed is:

1. A processor for a Time Division Duplex, TDD, system, comprising:
   an internal system bus;
   a memory coupled to the internal system bus;
   a Common Public Radio Interface, CPRI, lane controller, comprising:
      a transaction counter;
      a steering control;
      a switch fabric; and
      a Direct Memory Access, DMA, controller coupled to the memory through the switch fabric to perform memory access transactions via the internal system bus, the DMA controller to generate a transaction interrupt for each completed memory access transaction, the transaction counter to count a number of memory access transactions based upon the transaction interrupt for each completed memory access transaction and provide a TDD slot awareness interrupt to the steering control when a TDD slot has terminated, and the steering control to steer the memory access transactions to the memory prior to receiving the TDD slot awareness interrupt, and to block the memory access transactions from the memory after receiving the TDD slot awareness interrupt to save bandwidth, BW, of the internal system bus of the processor.

2. The processor of claim 1, the internal system bus comprising a High-Speed Serial Interface, HSSI.

3. The processor of claim 2, the HSSI to transmit and receive CPRI data via a CPRI serial data link to/from a radio equipment, RE, of a remote radio head, RRH, or a radio equipment control, REC.

4. The processor of claim 3, the CPRI serial data link comprising an uplink, UL, for receiving CPRI data in a first continuous serial bit stream from the RE, and a downlink, DL, for transmitting CPRI data in a second continuous serial bit stream to the RE.

5. The processor of claim 4, wherein, for each of the first and second continuous serial bit streams, a predetermined number of the bits is transported in a basic frame, BF, representing a data chip and packed together with a predetermined number of other basic frames, BF, into a hyper frame, HF, packed with a predetermined number of other hyper frames, HF, into a radio frame, RF.

6. The processor of claim 4, the first continuous serial bit stream comprising a first zero bit stream when CPRI data is transported in the DL, the second continuous serial bit stream comprises a second zero bit stream when CPRI data is transported in the UL, and the first continuous serial bit stream comprises the first zero bit stream and the second continuous serial bit stream comprises the second zero bit stream when the CPRI link is idle.

7. The processor of claim 4, wherein a ratio between CPRI data transported in the UL and CPRI data transported in the DL is configurable.

8. The processor of claim 5, the CPRI lane controller comprising a CPRI framer that encapsulates data received from the DMA controller into frames transmitted through the CPRI link to the RE, and extract data from received frames received through the CPRI link from the RE, wherein the extracted data are supplied to the DMA controller.

9. The processor of claim 1, the transaction counter comprising a write transaction counter that counts transaction interrupts for each completed write memory access transaction.

10. The processor of claim 9, wherein the write transaction counter is triggered to start counting transaction interrupts when a first agreed RF boundary between two RFs of the first continuous serial bit stream is detected by the CPRI framer.

11. The processor of claim 1, the transaction counter comprising a read transaction counter that counts transaction interrupts for each completed read memory access transaction.

12. The processor of claim 11, wherein the read transaction counter is triggered to start counting transaction interrupts upon a second agreed RF boundary between two RFs of the second continuous serial bit stream encapsulated by the CPRI framer into frames.

13. The processor of claim 1, the transaction counter to generate the TDD slot awareness interrupt if a corresponding configurable threshold value is reached, wherein the threshold value is set according to a configured uplink/downlink ratio of the respective CPRI link and a transaction size of a memory access transaction.

14. The processor of claim 1, wherein, in each memory access transaction, a predetermined number of data bits is exchanged between the switch fabric and the memory, and associated steering bits are provided as sideband information to indicate a data path to be taken by the data bits via the internal system bus.

15. The processor of claim 1, the steering control to steer the blocked memory access transaction by setting the steering bits of the respective memory access transaction to a predetermined code (NULL).

16. The processor of claim 15, wherein the setting of the steering bits to the predetermined code (NULL) is performed by a program executed by a core of the processor, or by a steering bit control logic of the processor.

17. The processor of claim 2, wherein the memory is a Double Data Rate, DDR, memory connected to a DDR controller of the processor, which is connected to the HSSI via a fabric.

18. The processor of claim 2, wherein the memory is a cache memory of the processor, connected to the HSSI via a fabric.

19. The processor of claim 2, wherein the memory forms part of a Multi-Accelerator Platform Engine (MAPLE) hardware acceleration engine of the processor, connected to the HSSI via a fabric.

20. A method, comprising:
coupling a Direct Memory Access (DMA) controller of a Common Public Radio Interface (CPRI) lane controller to a memory through a switch fabric;
performing, by the DMA controller, memory access transactions via an internal system bus of the CPRI lane controller;
generating, by the DMA controller, a transaction interrupt for each completed memory access transaction;
counting, by a transaction controller of the CPRI lane controller, a number of memory access transactions based upon the transaction interrupt for each completed memory access transaction;
providing, by the transaction controller, a Time Division Duplex (TDD) slot awareness interrupt to a steering control of the CPRI lane controller when a TDD slot has terminated;
steering, by the steering control, the memory access transactions to the memory prior to receiving the TDD slot awareness interrupt; and
blocking, by the steering control, the memory access transactions from the memory after receiving the TDD slot awareness interrupt to save bandwidth (BW) of the internal system bus of the processor.

* * * * *